United States Patent [19]

Shiraishi et al.

[11] Patent Number: 5,029,270
[45] Date of Patent: Jul. 2, 1991

[54] HOUSING CASE FOR ELECTROMECHANICAL EQUIPMENT

[75] Inventors: Takayuki Shiraishi, Suwa; Teruo Uchiyama, Chino, both of Japan

[73] Assignee: Chinon Kabushiki Kaisha, Nagano, Japan

[21] Appl. No.: 394,494

[22] Filed: Aug. 16, 1989

[51] Int. Cl.$^5$ .............................................. H02G 3/08
[52] U.S. Cl. ........................................ 174/50; 174/52.1
[58] Field of Search ...................... 174/50, 52.1, 84 R, 174/84 C, 84 S, 74 R, 74 A; 220/3.92, 3.94

[56] References Cited

U.S. PATENT DOCUMENTS

| 1,737,824 | 12/1929 | Brower | 312/7.1 |
| 2,541,236 | 2/1951 | Giuffrida | 174/50 |
| 4,225,748 | 9/1980 | Buck et al. | 174/52.1 |
| 4,654,471 | 3/1987 | Masaki et al. | 174/50 |

FOREIGN PATENT DOCUMENTS

| 1929579 | 10/1965 | Fed. Rep. of Germany . |
| 155435 | 7/1956 | Sweden | 174/50 |
| 966938 | 8/1964 | United Kingdom . |
| 1389520 | 4/1975 | United Kingdom . |

Primary Examiner—Leo P. Picard
Assistant Examiner—Bot L. Ledynh
Attorney, Agent, or Firm—Morrison Law Firm

[57] ABSTRACT

An housing case for electromechanical equipment requires connection of electric wires such as power cord, and incoming/outgoing singal lines. The housing case includes a body and a cover mounted on the body. A slant face having electric wire connections is formed on the body. The cover has two symmetrical sides which correspond to a portion of the housing case omitted to form the slant face. An electric wire hole for inserting electric wires to be connected to the electric wire connection is formed in one of the two sides of the cover. The cover is mounted on the body to cover the slant face. The electric wires are inserted through the electric wire hole on the cover. Then the cover is installed on the body to cover the slant face. The electric wire hole can be installed in either of two positions, thereby selecting either of two directions for the electric wires.

3 Claims, 2 Drawing Sheets

HOUSING CASE FOR ELECTROMECHANICAL EQUIPMENT

BACKGROUND OF THE INVENTION

1. Field of the Invention

This invention relates to a housing case for electromechanical equipment, and is particularly concerned with a housing case for electromechanical equipment through which pass electric wires such as power cords, incoming/outgoing signal lines and the like.

2. Description of the Prior Art

In electromechanical equipment such as photoelectric switches, OA equipment, AV equipment and the like, external wires pass, in most cases, through an electric wire hole provided in the back of a housing case.

In the aforementioned construction where an electric wire is directed rearward from the back of the housing case, the electric wire is rather obstructive and is an impediment to installing the equipment close to a wall surface or the like.

SUMMARY OF THE INVENTION

An object of the invention is therefore to make it possible to change the direction in which an electric wire passes through a housing when an electromechanical equipment is installed.

The invention comprises a housing case for electromechanical equipment consisting of a body and a cover mounted on the body, wherein a slant face is formed on the body between two mutually adjacent sides. An electric wire connection is provided on the slant face. The cover has two sides symmetrically in contour outline which substitute for the portion of the housing omitted to form the slant face. An electirc wire hole for inserting an electric wire to be connected to the electric wire connection formed on one of the two sides of the cover. The cover is mounted on the body to cover the slant face. The electric wire hole can be directed in either of two directions.

In the invention, an electric wire is connected to the electric wire connection on the slant face of the body. One or more electric wires are inserted through an electric wire hole on the cover. The cover is installed on the body to cover the slant face. The electric wire hole can be directed in one of two from the body by inverting the cover, thereby selecting the direction in which the electric wire is directed.

DETAILED DESCRIPTION OF THE PREFERRED EMBODIMENT

Figure 1:
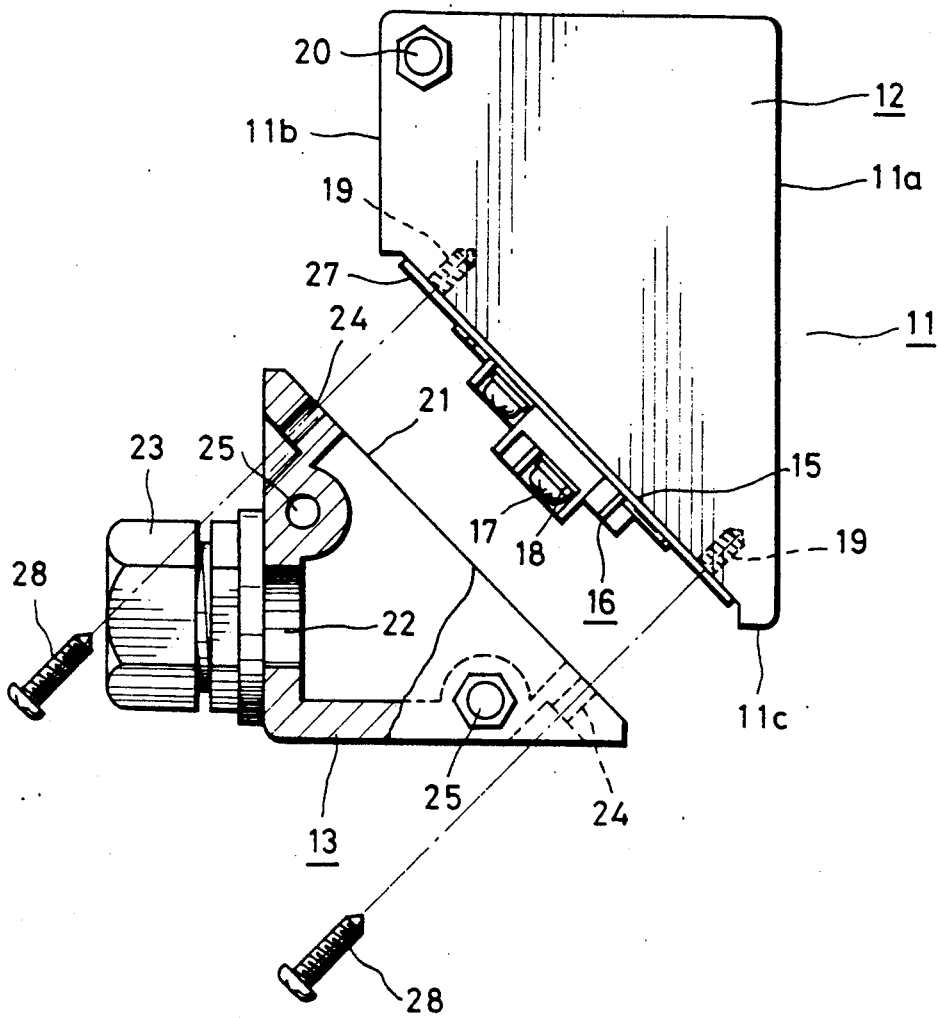
FIG. 1 is a side view, partly cutaway, representing a housing case for electro-mechanical equipment given in one embodiment of the invention.
Figure 2:
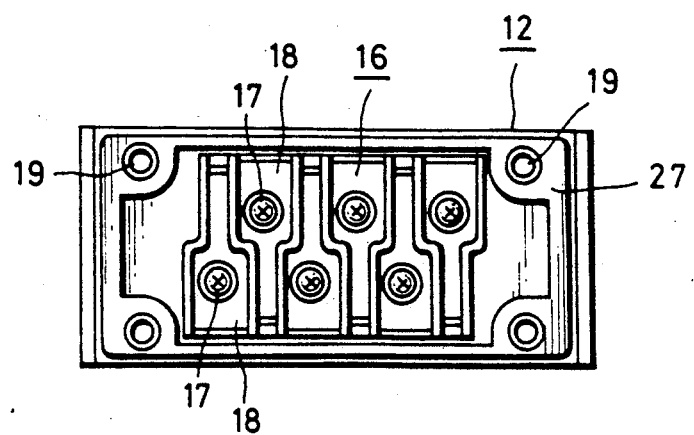
FIG. 2 is a view showing a lower portion of the slant face of a body of FIG. 1.

The invention will now be described with reference to the accompanying drawings representing one preferred embodiment thereof.

FIG. 1 to FIG. 4 represent electro-mechanical equipment such as a photoelectric switch and the like.

A reference numeral 11 denotes a housing case. The housing case 11 is a rectangular parallele piped elongated vertically, comprising a body 12 and a cover 13 mounted on the body 12.

A slant face 15 is formed on the body 12 by removing a portion such as a right-angled isosceles triangle between two mutually adjacent sides. The removed portion includes a lower portion of a back face 11b opposite a front face 11a of the housing case 11 and a rear portion of a lower face 11c adjacent thereto. An electric wire connection 16 is provided on the slant face 15. A plurality of terminals 18, each having a terminal screw 17, are disposed on the electric wire connection 16. Tapped holes 19 are formed on opposite end portions of the slant face 15. Further, a tapped hole 20 is formed in the rear of a side face of the body 12.

The cover 13 is shaped to complete the two sides that have removed portions to form the slant face 15. The contour outline of the cover 13 is shaped like a right-angled isosceles triangle to complete a lower portion of the back face 11b of the housing case 11 and the lower face 11c. The side of a slant face 21 corresponding to the slant face 15 of the body 12 is open. An electric wire hole 22 is formed on one of orthogonal faces. An electric wire bushing 23, for preventing the entry of moisture, is mounted on an outside of the electric wire hole 22. Coupling holes 24, corresponding to the tapped holes 19, are formed near opposite ends of the orthogonal faces. Further, tapped holes 25 are formed in a lower portion and in the rear of the side faces of the cover 13.

For installation, electric wires, such as a power cord, incoming/outgoing signal lines and the like, are connected to terminals 18 of the body 12. The wires are passed through the electric wire hole 22 of the cover 13 and through the electric wire bushing 23.

Next, the slant face 21 of the cover 13 is fitted to the slant face 15 of the body 12. A sealing gasket 27 such as rubber on the like is interposed therebetween. Screws 28 are fastened in the tapped holes 19 through each hole 24. The slant face 15 of the body 12 is thus covered with the cover 13 and thus the cover 13 is fixed on the body 12.

Figure 3:
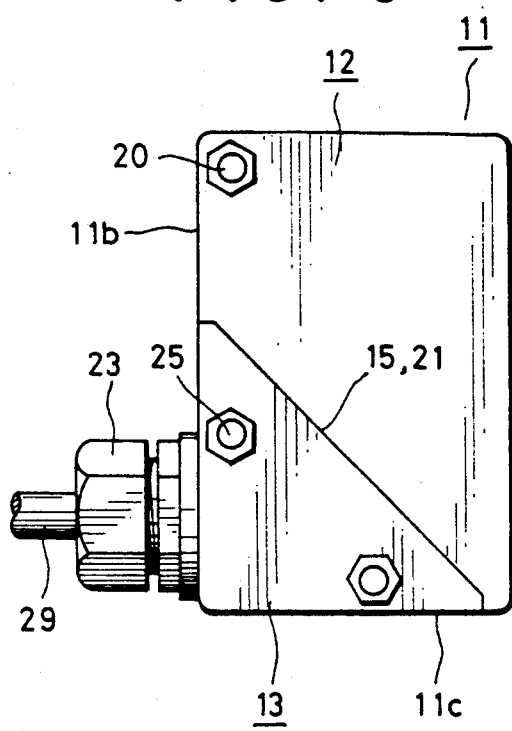
FIG. 3 and FIG. 4 are side views showing a state of installation.
Figure 4:
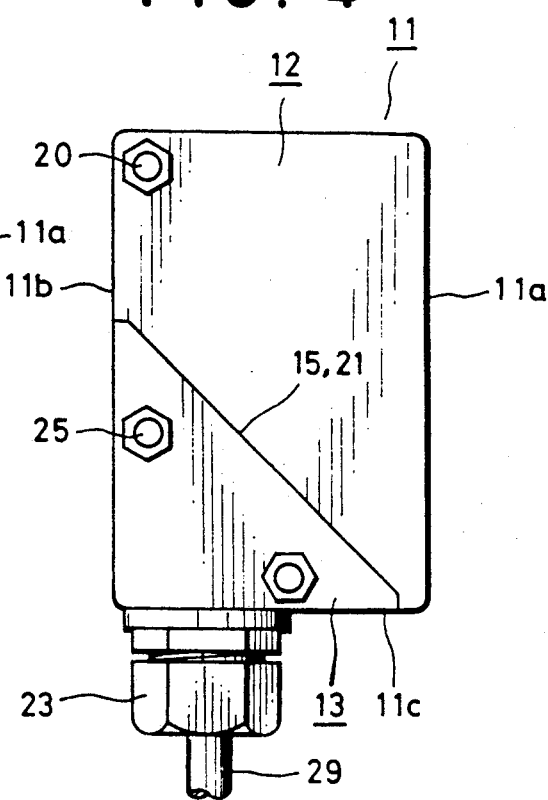

Referring now to FIG. 3, an electric wire 29 can be directed rearward by mounting the cover 13 with the electric wire hole 22 coming rearward. Referring now to FIG. 4, the electric wire 29 can be directed downward by mounting the cover 13 inverted with the electric wire hole 22 directed downward.

The outline of cover 13 is shaped like a right-angled isosceles triangle and hence is symmetrical with reference to a line connecting the vertical angle portion and a midpoint of the slant face 21. This permits the cover 13 to be installed with the slant face 21 upside-down without changing the contour, but only the position of the electric wire hole 22. Therefore the direction in which the electric wire is directed can be changed as described when the cover 13 is shaped like a right-angled isosceles triangle or approximate thereto.

The housing case 11 may be mounted on an external support member (not shown) by means of the tapped holes 20 and 25.

Another embodiment of the invention will be described with reference to FIG. 5.

Figure 5:
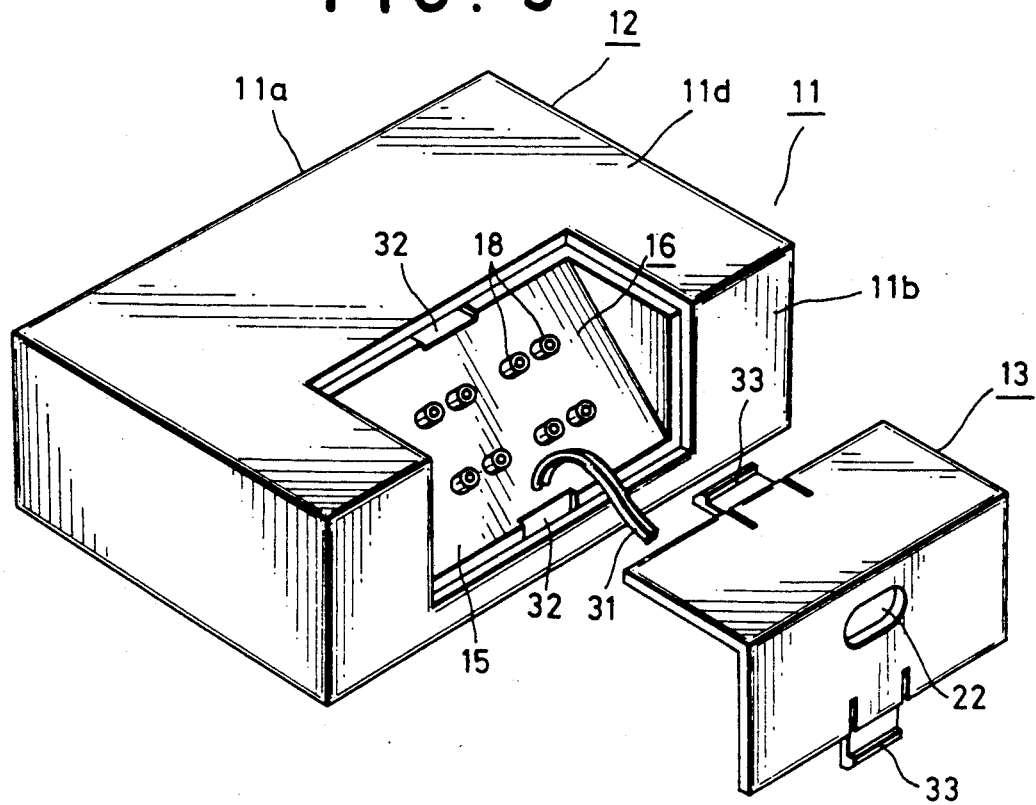
FIG. 5 is a perspective view representing another embodiment of the invention.

FIG. 5 represents an electromechanical equipment such as an audio amplifier or the like.

In this case, the housing case 11 is a rectangular parallelopiped elongated horizontally. A slant face 15 is formed on the body 12 by removing a portion of a right-angled isosceles triangle covering an intermediate zone between the back face 11b of the housing case 11 and the rear of a top face 11d adjacent thereto. A plurality of plug-in type terminals 18 are disposed on the electric wire connection 16 of the slant face 15. A power cord 31 is also connected thereto. Further, engaging parts 32 are formed on central upper and lower portions of the slant face 15.

The cover 13 has a shape of having two sides defined by portions of housing case 11 that are omitted to form the slant face 15. The contour outline of the cover 13 is a right-angled isosceles triangle to continue the back face 11b of the housing case 11 and the rear of the top face 11d. Opposite side plates for forming a slant face on cover 13 are not provided. Thus, cover 13 is shaped like "L". The electric wire hole 22 is formed on one of the orthogonal faces of the cover 13. An engaging claw 33 capable of mating with the engaging part 32, extends from an intermediate zone of cover 13 between opposite ends thereof.

In use, electric wires other than the power cord 31 such as incoming/outgoing signal line and others are connected to terminals 18 or the body 12. The power cord 31 and the other wires are inserted through the electric wire hole 22 of the cover 13.

Then, the cover 13 is disposed on the slant face 15 of the body 12. The engaging claws 33 are inserted into engaging parts 32. The slant face 15 of the body 12 is covered with the cover 13. Thus the cover 31 is fixed on the body 12.

The electric wires can be directed rearward from mounting the cover 13 with the electric wire hole 22 facing rearward, or the electric wire can be directed upward by mounting the cover 13 with the electric wire hole 22 facing upward.

According to the invention, the direction in which the electric wire is directed can be changed and selected by inversion of the cover 13. Accordingly equipment can be arbitrarily installed and used without being regulated by the direction in which the electric wire is directed.

What is claimed is:

1. A housing for electrical equipment comprising:
   a body;
   said body including a slant face between two adjacent sides thereof;
   an outline of an omitted portion of said body defining said slant face being a generally right-angled isosceles triangle;
   a cover;
   an outline of said cover being generally a right-angled isosceles triangle congruent with said omitted portion;
   said cover having first and second sides;
   an electric wire hole in one of said first and second sides;
   means for affixing said cover to said slant face, whereby an outline of said housing, with said cover affixed to said body, is generally rectangular; and
   said means for affixing including means for permitting said cover to be affixed to said body in either one of two possible orientations, whereby a location of said electric wire hole with respect to said body is selectable.

2. A housing according to claim 1, wherein:
   said slant face is disposed in an intermediate location along a length of said housing; and
   said cover includes an L-shaped member.

3. A housing according to claim 2, wherein said means for affixing includes:
   at least one engaging part on said body;
   at least one claw on said cover; and
   said at least one claw engaging said at least one engaging part in two possible orientations of said cover with respect to said body.

* * * * *